United States Patent
Yoo et al.

(10) Patent No.: US 7,813,758 B2
(45) Date of Patent: Oct. 12, 2010

(54) MULTITASKING METHOD AND MOBILE TERMINAL ENABLED WITH THE SAME

(75) Inventors: Seung Hun Yoo, Seoul (KR); Byeong Cheol Hwang, Seoul (KR); Min Suk Jang, Anyang-si (KR); Yu Ran Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 674 days.

(21) Appl. No.: 11/801,497

(22) Filed: May 10, 2007

(65) Prior Publication Data

US 2007/0275757 A1    Nov. 29, 2007

(30) Foreign Application Priority Data

May 23, 2006    (KR)    ............ 10-2006-0046247

(51) Int. Cl.
*G06F 15/16*    (2006.01)
(52) U.S. Cl. .................... 455/550.1; 455/557
(58) Field of Classification Search ............. 455/411, 455/423, 550.1, 575.1, 575.3, 575.4, 556.1, 455/557
See application file for complete search history.

(56) References Cited

U.S. PATENT DOCUMENTS

2005/0250534 A1* 11/2005 Maurer .................. 455/556.1
2005/0268127 A1* 12/2005 Shiba et al. ............... 713/320
2006/0033809 A1*  2/2006 Farley .................... 348/14.01

FOREIGN PATENT DOCUMENTS

KR    1020000061817    10/2000
KR    10-0560099    3/2006

* cited by examiner

*Primary Examiner*—Sam Bhattacharya
(74) *Attorney, Agent, or Firm*—The Farrell Law Firm, LLP

(57) ABSTRACT

A multitasking method and mobile terminal enabled with the multitasking method are provided for executing, while a function is running, another function. The multitasking-enabled mobile terminal includes an input unit for receiving a user command; a decision unit for determining, if a command for activating an additional function is input through the input unit while at least one previously activated function operates, whether the additional function can run at the same time with the previously activated function; a control unit for activating, if the decision unit determines that the additional function can operate at the same time with the previously activated functions, the second function; and a display unit for displaying operation status of the additional and previously activated functions on a screen.

22 Claims, 20 Drawing Sheets

US 7,813,758 B2

MULTITASKING METHOD AND MOBILE TERMINAL ENABLED WITH THE SAME

PRIORITY

This application claims priority to an application entitled "MULTITASKING METHOD AND MOBILE TERMINAL ENABLED WITH THE SAME" filed in the Korean Intellectual Property Office on May 23, 2006 and assigned Serial No. 2006-0046247, the contents of which are incorporated herein by reference.

BACKGROUND OF THE INVENTION

1. Field of the Invention

The present invention relates to a mobile terminal and, in particular, to a multitasking method and mobile terminal enabled with the multitasking method that are capable of executing, while a function is running, another function.

2. Description of the Related Art

A mobile terminal with a single central processing unit can execute only one task at a time. Typically, frequently used operations of the mobile terminal are accessed with shortcut keys.

In such a mobile terminal, when a task is running, another task is not processed even when a corresponding shortcut key is input. For example, although a shortcut key is input for activating a camera function, the camera function is not activated while the CPU is processing data or voice communication. This processing sequence is caused by all functions of the mobile terminal being assigned unique priorities. Accordingly, when a function is called while another function is running, the called function is ignored if it has a lower priority than that of the currently running function. In contrast, if the called function has a higher priority than that of the currently running function, the currently running function is terminated and the called function starts running.

However, the various functions are integrated into the mobile terminal, a need for simultaneously running multiple functions simultaneously has been increased.

SUMMARY OF THE INVENTION

The present invention solves the above problems, and it is an object of the present invention to provide a multitasking method and mobile terminal enabled with the multitasking method that are capable of processing multiple functions, simultaneously.

It is another object of the present invention to provide a multitasking method and mobile terminal enabled with the multitasking method that are capable of providing a novel convergence function by simultaneously executing at least two different functions of the mobile terminal.

In accordance with an aspect of the present invention, the above and other objects are accomplished by a mobile terminal. The mobile terminal includes an input unit for receiving a user command; a decision unit for determining, if a command for activating an additional function is input through the input unit while at least one previously activated function operates, whether the additional function can run at the same time with the previously activated function; a control unit for activating, if the decision unit determines that the additional function can operate with at the same time with the previously activated functions, the second function; and a display unit for displaying operation status of the additional and previously activated functions on a screen.

In accordance with another aspect of the present invention, the above and other objects are accomplished by a multitasking method for a mobile terminal. The multitasking method includes determining, if a command for activating an additional function while at least one previously activated function is operating, whether the additional function can operate at the same time with the previously activated function; activating, if the additional functions can operate with the previously activated function, the additional function; and displaying operation status of the additional function and the previously activated function on a screen.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Preferred embodiments of the present invention are described with reference to the accompanying drawings in detail. To the extent possible, the same reference numbers are used throughout the drawings to refer to the same or like parts. Detailed descriptions of well-known functions and structures incorporated herein may be omitted to avoid obscuring the subject matter of the present invention.

Figure 1:
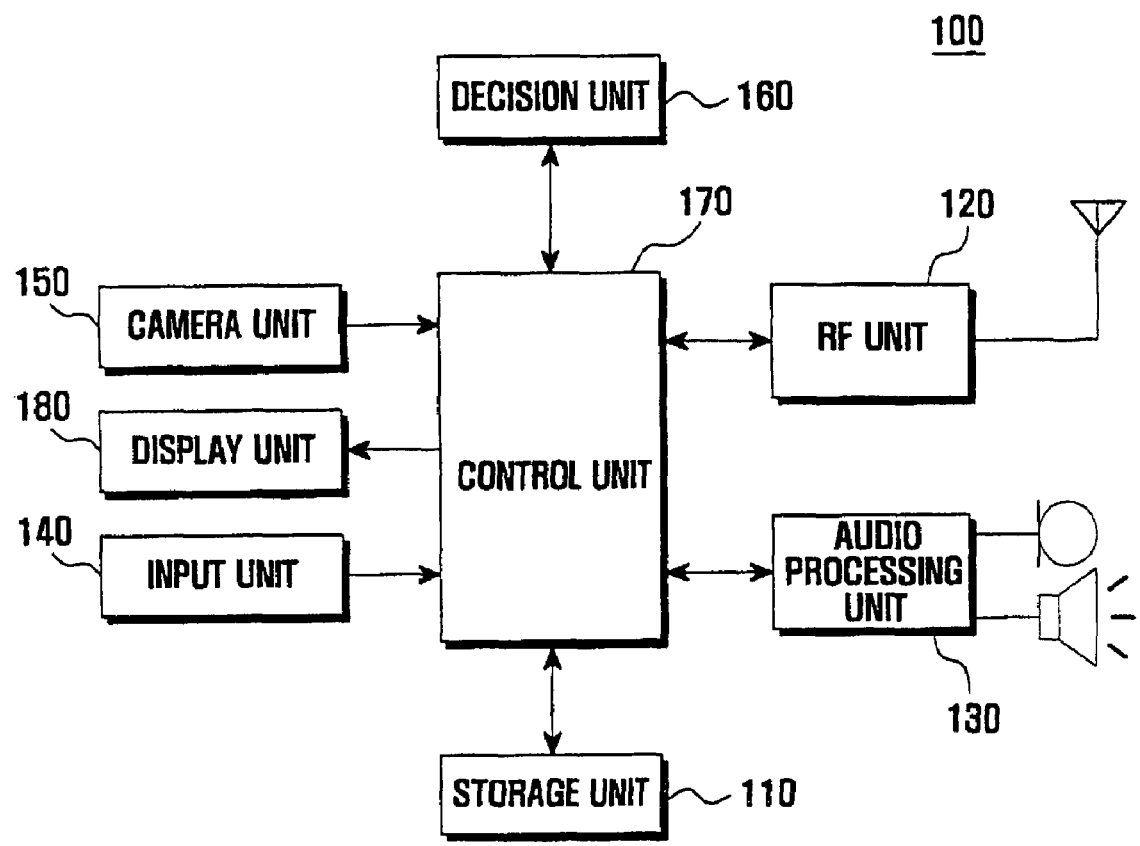
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring to FIG. 1, a mobile terminal 100 according to an exemplary embodiment of the present invention includes a storage unit 110, a Radio Frequency (RF) unit 120, an audio processing unit 130, an input unit 140, a camera unit 150, a decision unit 160, a control unit 170 and a display unit 180.

The storage unit 110 stores programs for executing functions of the mobile terminal 100. Particularly, the storage unit 110 stores audio files. The storage unit 100 also stores a list indicating currently running function items.

The RF unit 120 is responsible for radio communication with a base station. The RF unit 120 is implemented so as to transmit, if an additional function is requested for processing data for a voice communication, a radio signal associated with the additional function, simultaneously.

For example, if a key input for activating a camera function is detected, the mobile terminal transmits a video telephony request message to a counterpart terminal and, if a video telephony response message is received from the counterpart terminal, exchanges the audio and video signals with the counterpart terminal. The RF unit 120 can simultaneously process the incoming and outgoing audio and video signals.

The audio processing unit 130 is provided with an audio codec for processing audio signals including voice. The audio processing unit 130 demodulates an incoming digital signal using the audio codec and outputs the demodulated signal through a speaker as an audible sound wave, and modulates an outgoing voice signal using the audio codec and outputs a digital audio signal to the RF unit 120.

The input unit 140 receives commands input by a user. For example, the input unit 140 is provided with a function key for activating a camera function so as to allow input of a command for activating the camera unit 150, which takes an image.

The decision unit 160 determines, when a specific function enable command is input while a previously activated function is running, whether the two functions can simultaneously run, i.e. run at the same time. The previously activated function can be at least one of voice communication, audio playback and camera functions.

If a specific function enable command is input while the mobile terminal 100 performs a voice communication function, the decision unit 160 determines whether the specific function can run with the voice communication function.

For example, if a camera function enable command is input while the mobile terminal 100 performs voice communication, the decision unit 160 determines whether the camera function can run with the voice communication function.

The control unit 170 controls the general operation of the mobile terminal 100. In particular, when the decision unit 160 determines that two functions can simultaneously run, the control unit 170 activates the most recently requested function to run with the previously activated function at the same time. Particularly, the two functions can be provided as a converged function.

If a command is received for terminating one of the running functions, the control unit 170 terminates the corresponding function. Also, all the currently running functions can be terminated at time by a termination command.

For example, the control unit 170 displays a list of currently running functions, to allow termination of one or more functions selected on the list. At this time, the control unit 170 checks the function to be terminated in accordance with a selection command input through the input unit 140.

Also, the currently running functions can be presented as corresponding icons. In this case, at least one icon can be selected in accordance with the selection command and the function represented by the selected icon is terminated in accordance with a command for terminating the selected function. Navigation among the icons can be performed with up and down navigation keys and selection of an icon can be performed with left and right navigation keys.

The display unit 180 displays information on the operation status of the mobile terminal. Particularly, the function icons are displayed at predetermined positions.

The display unit 180 can display a screen split in several regions, each filled with an image representing a specific function. The display unit 180 also can display the currently running functions in split windows.

The display unit 180 also can display an image corresponding to a function requested to be activated over the images of the currently running functions. At this time, the transparency of the overlapped image can be adjusted.

Figure 2:
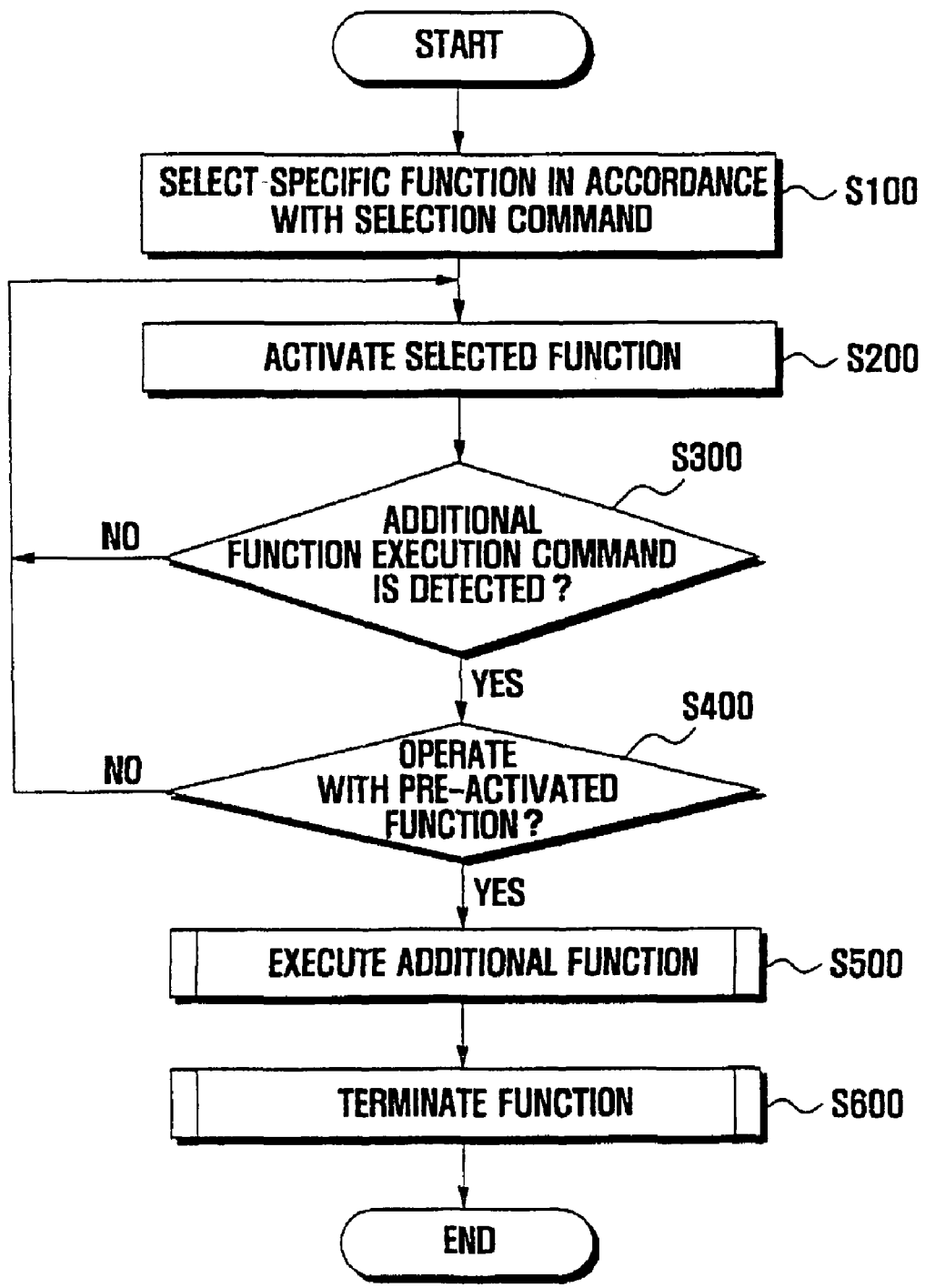
FIG. 2 is a flowchart illustrating a multitasking method for a mobile terminal according to an exemplary embodiment of the present invention.

FIG. 2 is a flowchart illustrating a multitasking method for a mobile terminal according to an exemplary embodiment of the present invention.

Referring to FIGS. 1 and 2, the control unit 170 of the mobile terminal 100 selects a specific function in accordance with a selection command input by a user in Step 100 and activates the selected function in accordance with a function execution command in Step 200. The specific function includes a voice communication function. The selection command can be input by a function key such as an audio playback function key or camera function key. While the mobile terminal 100 operates the selected function, the control unit 170 determines whether a command for operating an additional function is input in Step 300. If a command for operating an additional function is detected, the decision unit 160 determines whether the additional function can operate with the previously activated function at the same time (S400). Particularly, the decision unit 160 determines whether the additional function can operate with the previously activated function. The additional function preferably includes at least one of a voice communication, audio playback and camera functions.

The command for operating an addition function can be generated by a function key.

If the additional function can simultaneously operate with the previously activated function, the control unit 170 activates the additional function such that the two functions run at the same time in Step 500. At this time, the control unit 170 can control the two functions to cooperate for providing a converged function. In this embodiment, the multitasking method is described with two functions running at the same time. However, the number of the functions that are capable of operating at the same time can be more than two.

The additional function execution process is described in more detail with reference to FIGS. 3A to 3D.

If a command for terminating one of the currently running functions is input while operating more than one function, the control unit 170 terminates the function corresponding to the command in Step 600. Also, a command for terminating all the currently running functions can be input. The function termination process is described in more detail with reference below in regard to FIGS. 4A-D.

Figure 3A:
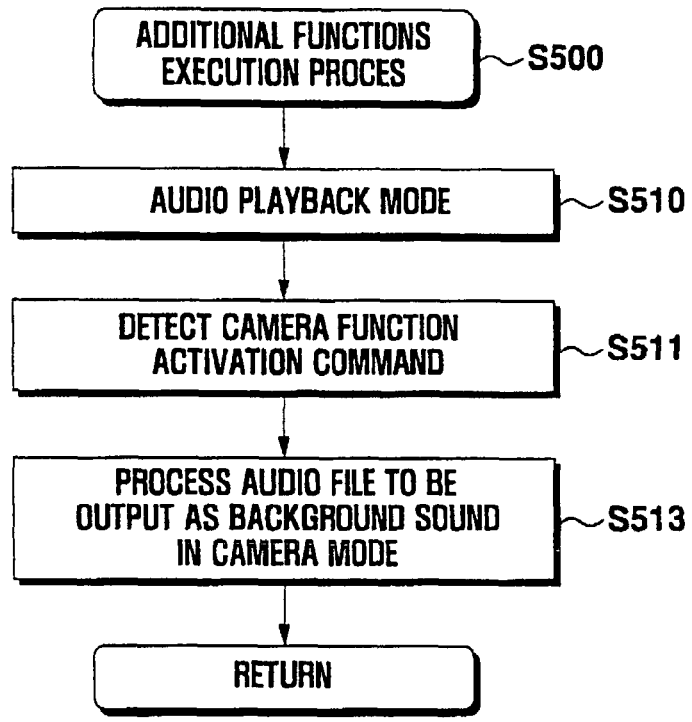
FIGS. 3A to 3D illustrate an additional function execution process of FIG. 2 for executing different previously activated functions.

FIGS. 3A to 3D are flowcharts illustrating additional function execution processes of the multitasking method of FIG. 2. FIG. 3A illustrates an additional function execution process when the previously activated function of FIG. 2 is an audio playback function.

In the additional function execution process in Step 500, the control unit 170 checks that the mobile terminal 100 operates in the audio playback mode in Step 510 and detects a command for activating a camera function in Step 511. If a command for activating a camera function is detected, the control unit 170 controls processing of an audio file to be output through the speaker (SPK) as an audible background sound and the camera unit to take an image in Step 513.

The control unit 170 can control recording of a motion picture with the background audio sound. The control unit 170 also can control the transmission of the motion picture with the background audio sound.

Figure 5A:
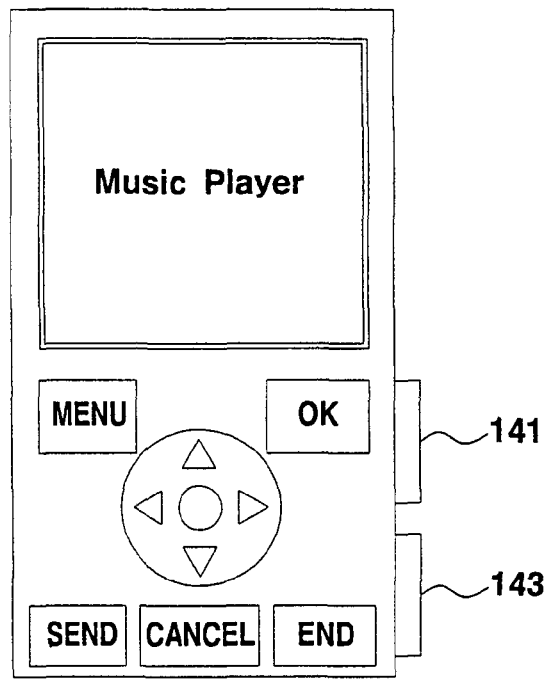
FIGS. 5A to 5C are front views of the mobile terminal of FIG. 1 illustrating steps of executing an additional function in a non-voice communication mode according to an exemplary embodiment of the present invention.
Figure 5B:
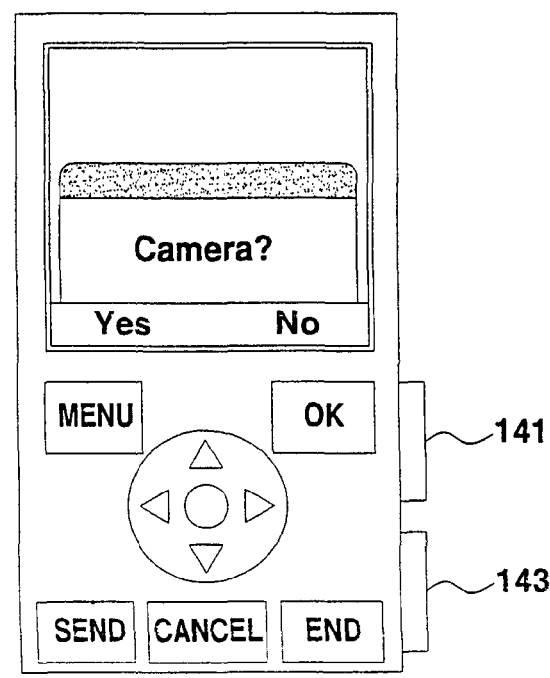
Figure 5C:
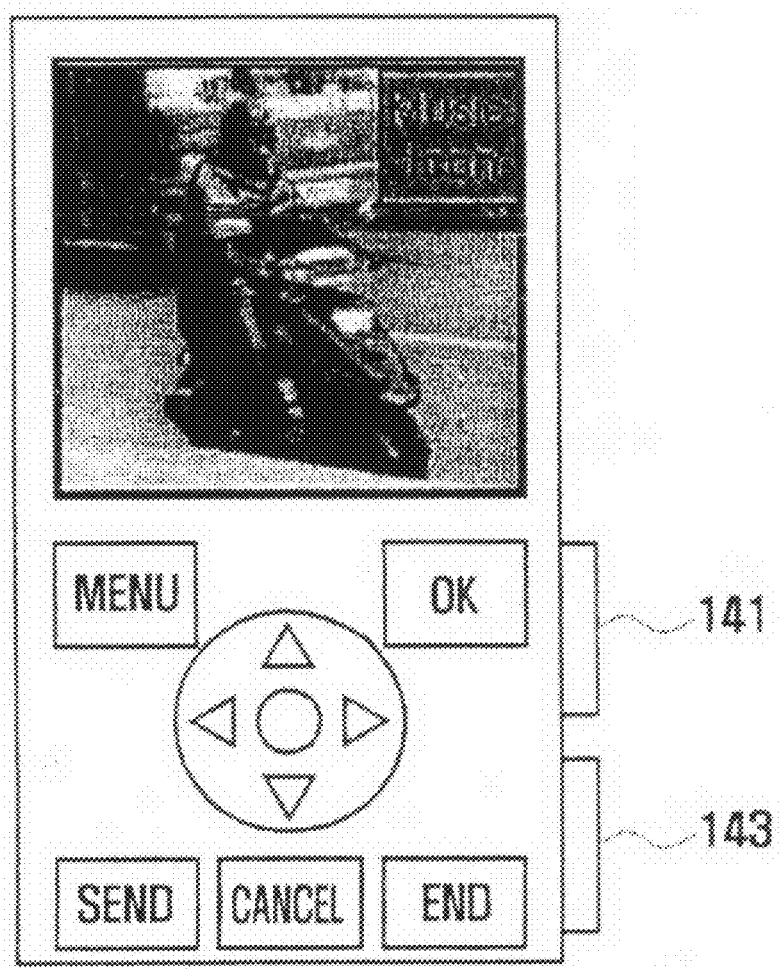

FIG. 5C is front view of the mobile terminal of FIG. 1 when a command for activating the camera function is input while the mobile terminal operates in the audio playback mode.

The control unit 170 can control the display unit 180 to display the images or icons representing the currently activated functions on a current function screen. The current function screen can be provided with split windows presenting images corresponding to the respective functions. The number of windows is, in a preferred embodiment, identical with that of the currently activated functions. The display unit 180 also can display the image representing the function requested to be activated on the images of the currently activated functions. Transparency of the overlapped image, i.e. the image representing the requested function can be adjusted.

The display unit 180 preferably displays icons corresponding to the currently activated functions at predetermined positions on the screen. Preferably, the icons are positioned at the bottom of the screen.

Figure 3B:
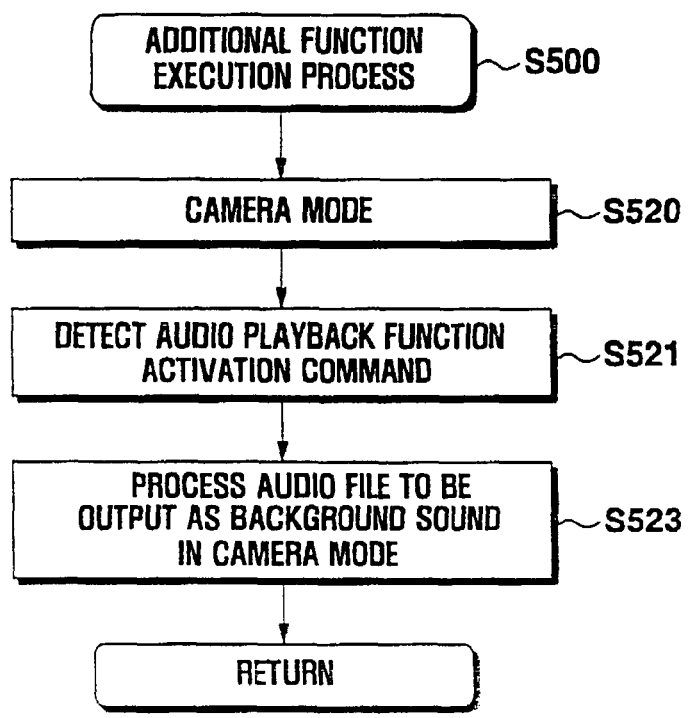

FIG. 3B illustrates an additional function execution process when the previously activated function of FIG. 2 is a camera function. In the additional function execution process, in Step 500, the control unit 170 checks that the mobile terminal 100 operates in a camera mode in Step 520 and detects a command for activating an audio playback function in Step 521.

If a key input for activating an audio playback function, the control unit 170 controls the camera unit to take an image and the audio processing unit 130 to output an audio signal through the speaker (SPK) as an audible background sound in Step 523.

Figure 6A:
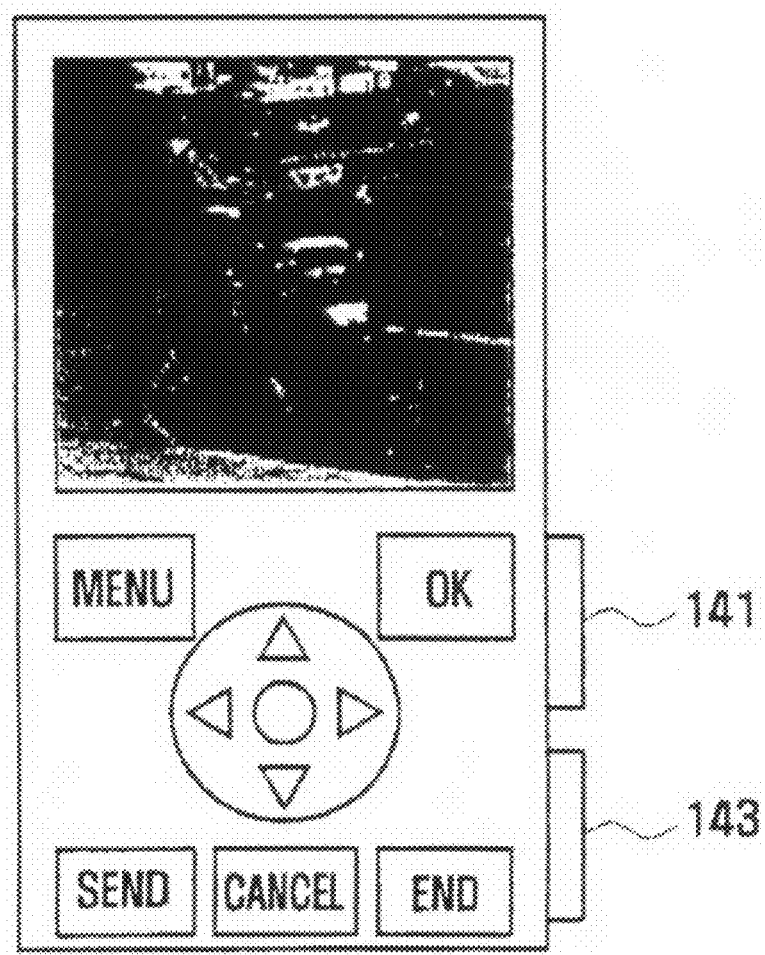
FIGS. 6A to 6C are front views of the mobile terminal of FIG. 1 illustrating steps of executing an additional function in a non-voice communication mode according to an exemplary embodiment of the present invention.
Figure 6B:
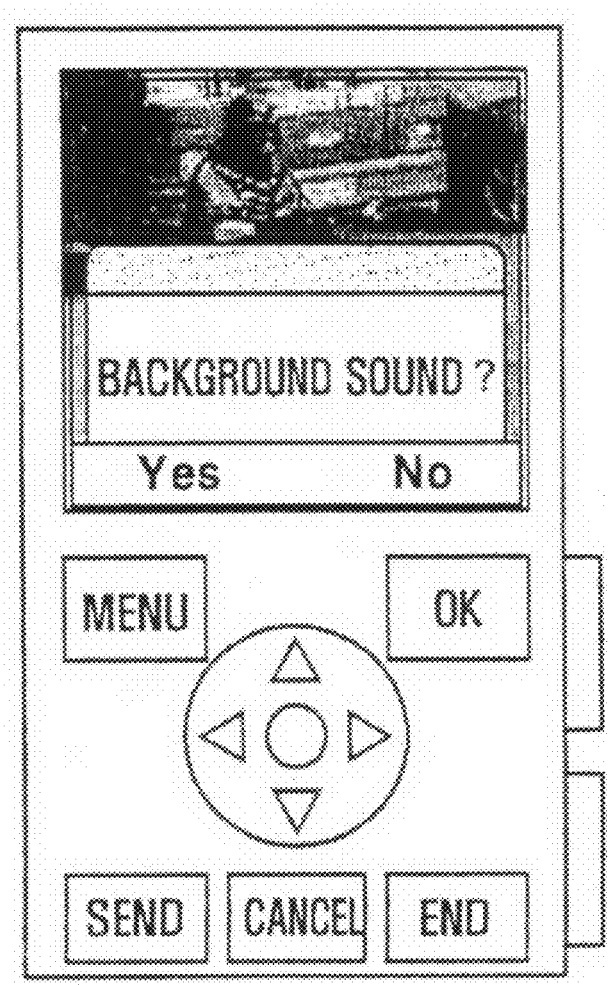

FIG. 6A is a front view of the mobile terminal, operating in the camera mode, of FIG. 1, and FIG. 6B is a front view of illustrating the mobile terminal of FIG. 1 when a command for activating the audio playback function is input while the mobile terminal operates in the camera mode.

Figure 6C:
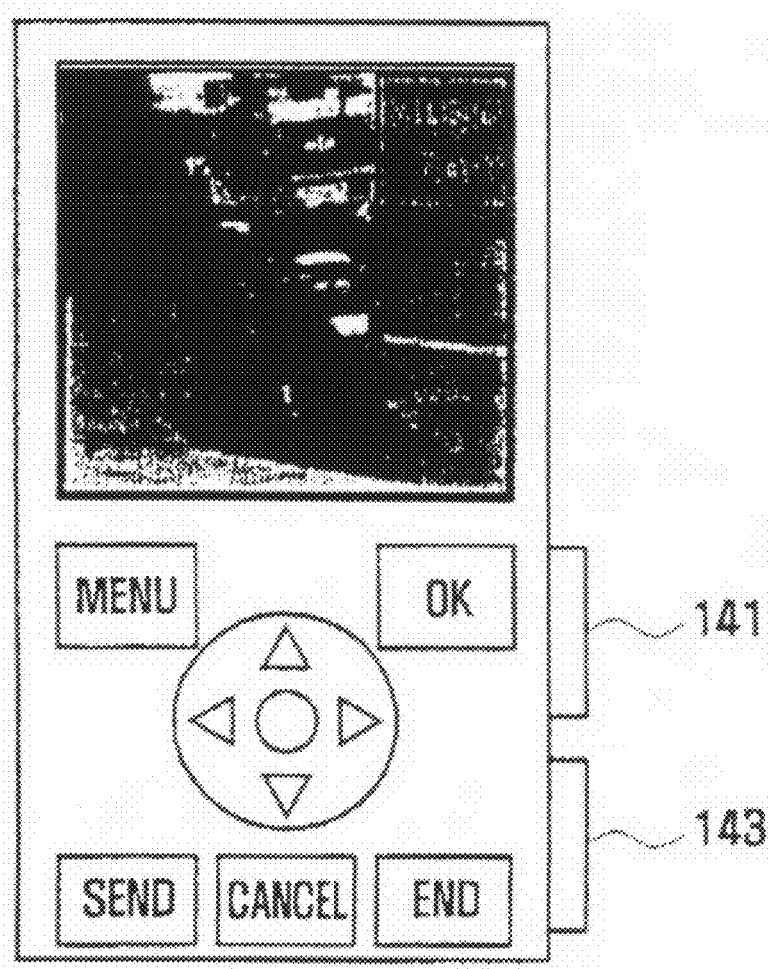

FIG. 6C is a front view of the mobile terminal of FIG. 1 when a command for activating the audio playback function is input while the mobile terminal operates in the camera mode.

Figure 3C:
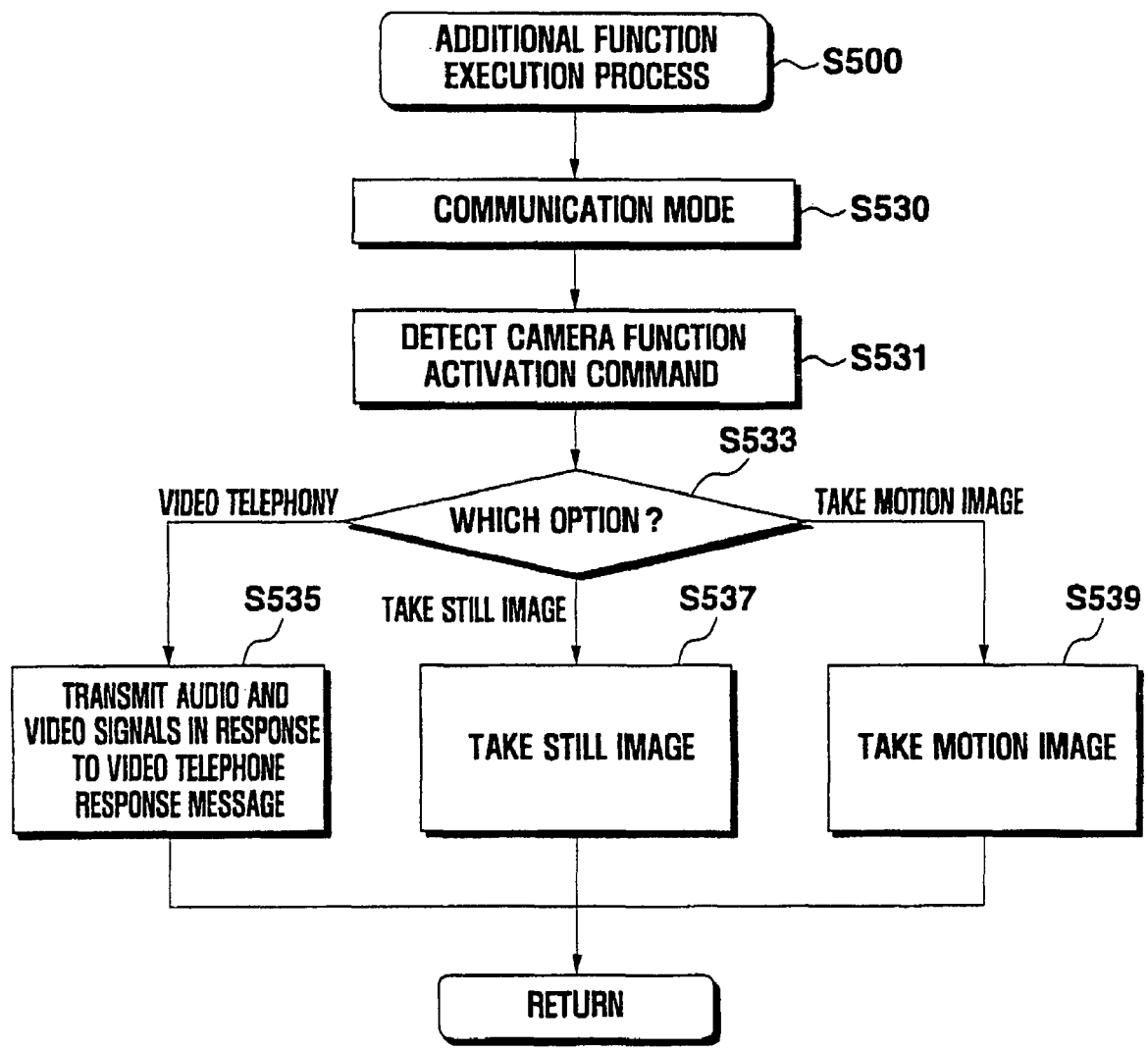

FIG. 3C illustrates an additional function execution process when the previously activated function of FIG. 2 is a voice communication function. In the additionally activated function execution process in Step 500, the control unit 170 checks that the mobile terminal 100 operates in a voice communication mode in Step 531.

Figure 7A:
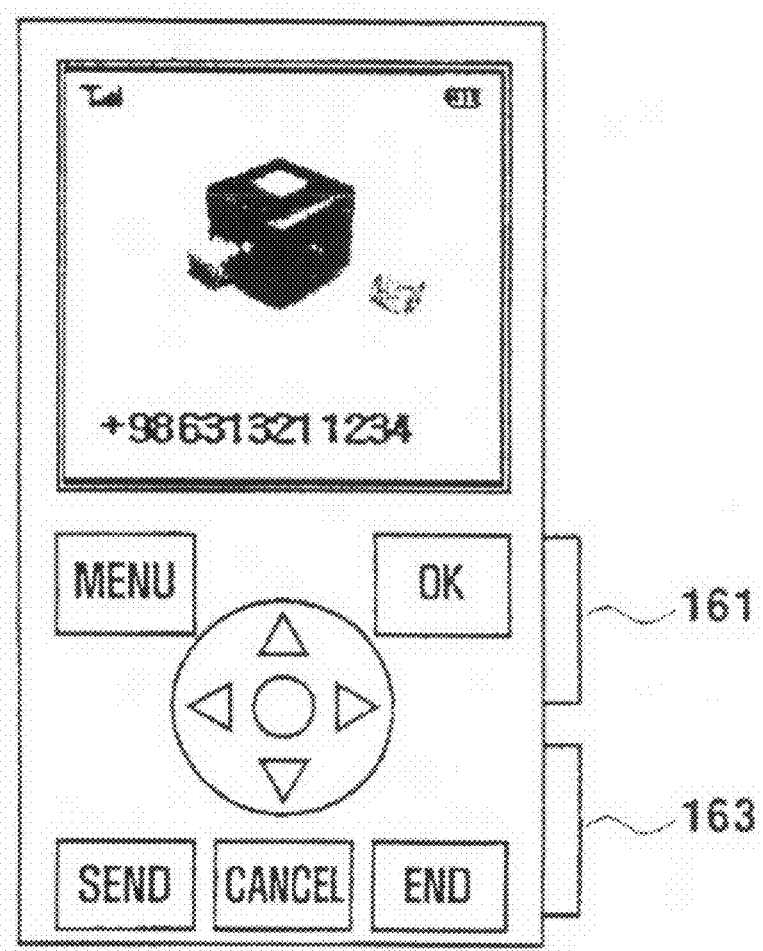
FIGS. 7A to 7C are front views illustrating steps of executing an additional function in a voice communication mode according to an exemplary embodiment of the present invention.
Figure 7B:
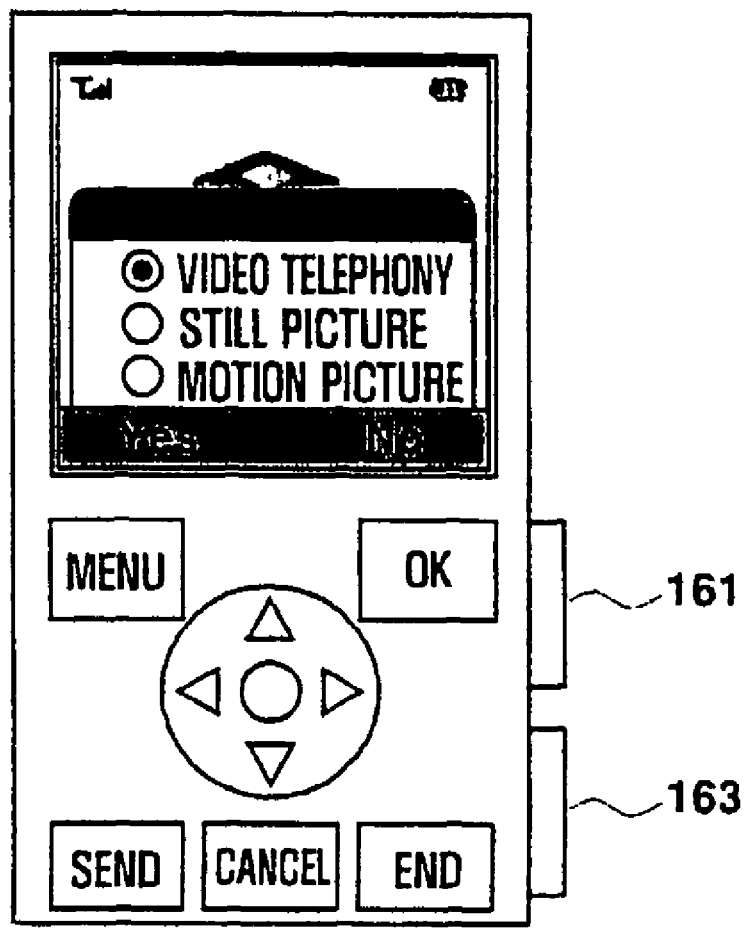

FIG. 7A is a schematic diagram illustrating the mobile terminal of FIG. 1, and FIG. 7B is a front view illustrates the mobile terminal of FIG. 1 when a command for activating a camera function is input while the mobile terminal operates in the voice communication mode. If a command for activating a camera function is input, a menu screen having a video telephony, still image, and motion image options is presented.

The control unit 170 determines which option is selected in Step 533 of FIG. 3C. If a video telephony option is selected on the menu screen, the control unit 170 transmits a video telephony request message to the counterpart terminal. If a video telephony response message is received from the counterpart terminal, the control unit 170 enters into a video telephony mode so as to transmit video and audio signals at the same time in Step 535.

Figure 7C:
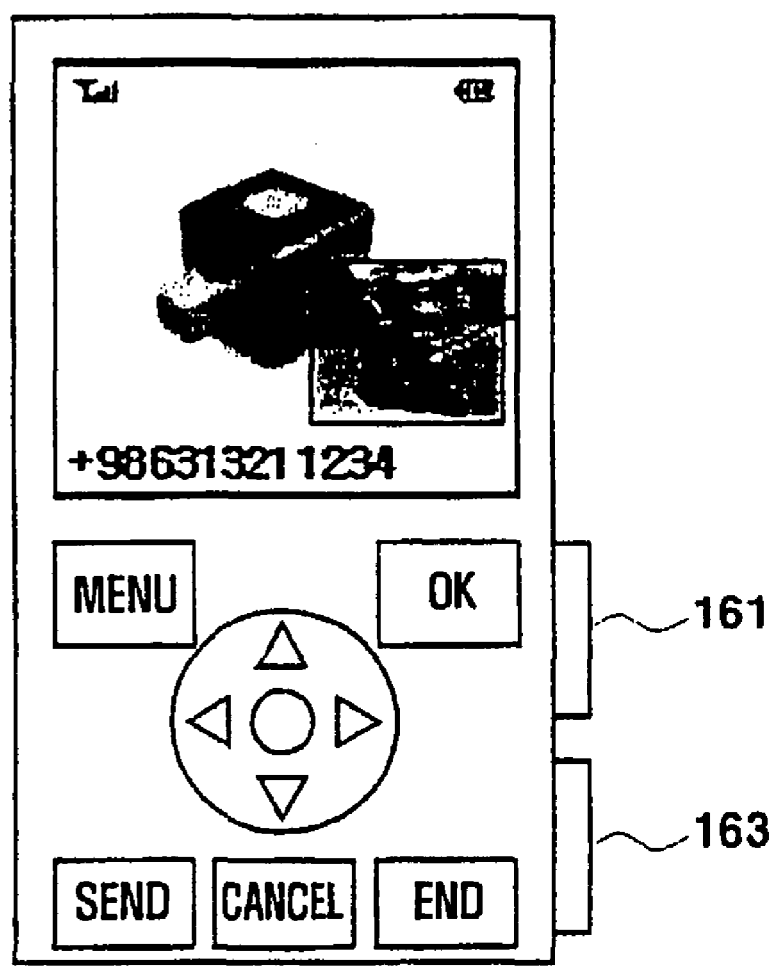

FIG. 7C is a front view illustrating a mobile terminal of FIG. 1 when an option selection command for activating a video telephony function is input while the mobile terminal operates in the voice communication mode.

At step 533 of FIG. 3C, if the still image option is selected, the control unit 170 enables the camera unit 150 to take a still image in the voice communication mode in Step 537. If the motion image option is selected, the control unit 170 enables the camera unit to take a motion image during voice communication in Step 539.

The control unit 170 detects an audio playback command input by an audio playback function key 143 (FIGS. 5 and 6) while the mobile terminal operates in the video telephony mode. If the audio playback command is detected, the control unit 170 controls the audio processing unit to output an audio signal through the speaker (SPK) in the video telephony mode.

Figure 3D:
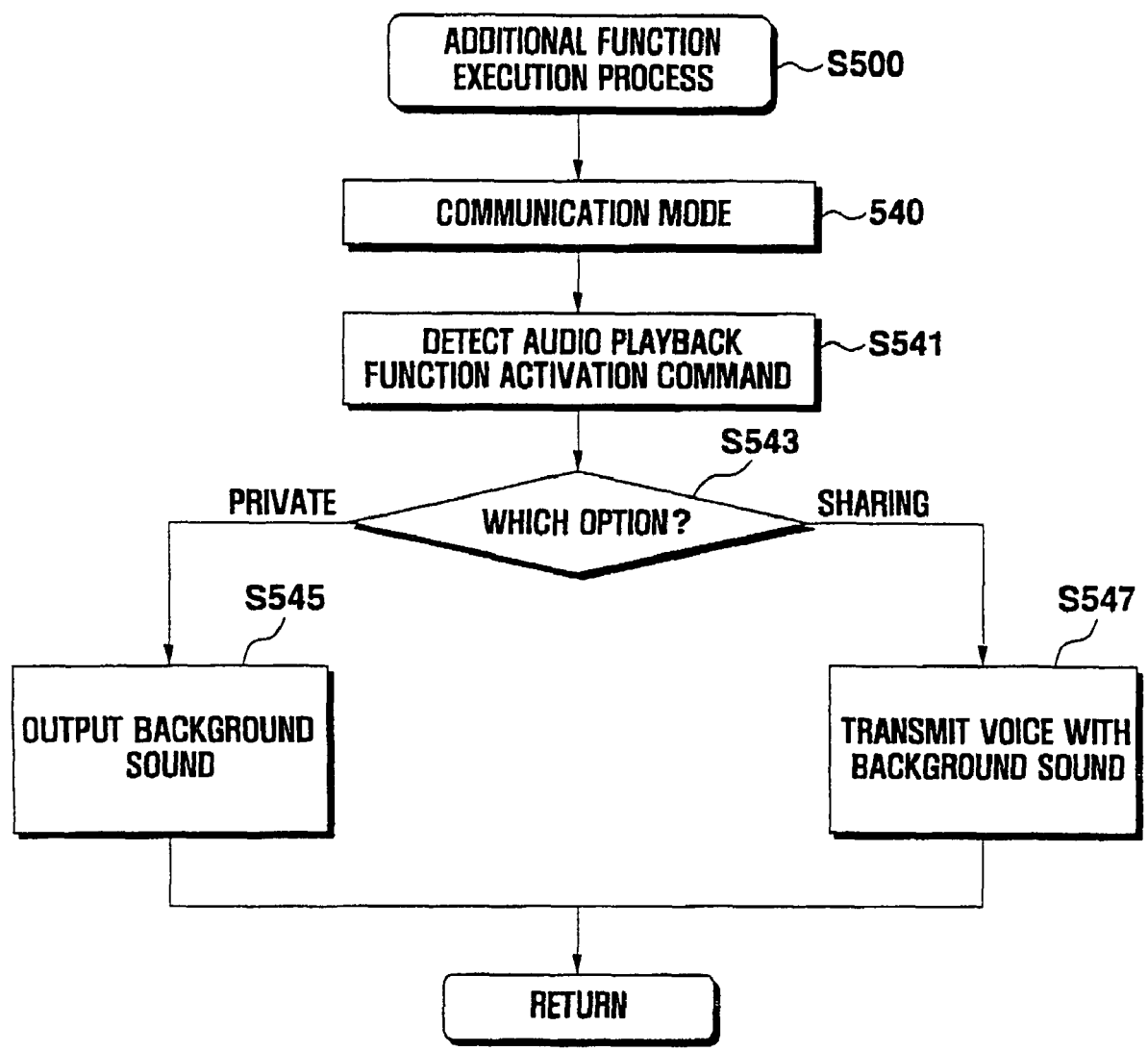

FIG. 3D illustrates an additional function execution process in Step 500 when the previously activated function of FIG. 2 is voice communication function. In the additional function execution process in Step 500, the control unit 170 checks that the mobile terminal 100 operates in the voice communication mode in Step 540 and detects a command for activating an audio playback function in Step 541.

Figure 8A:
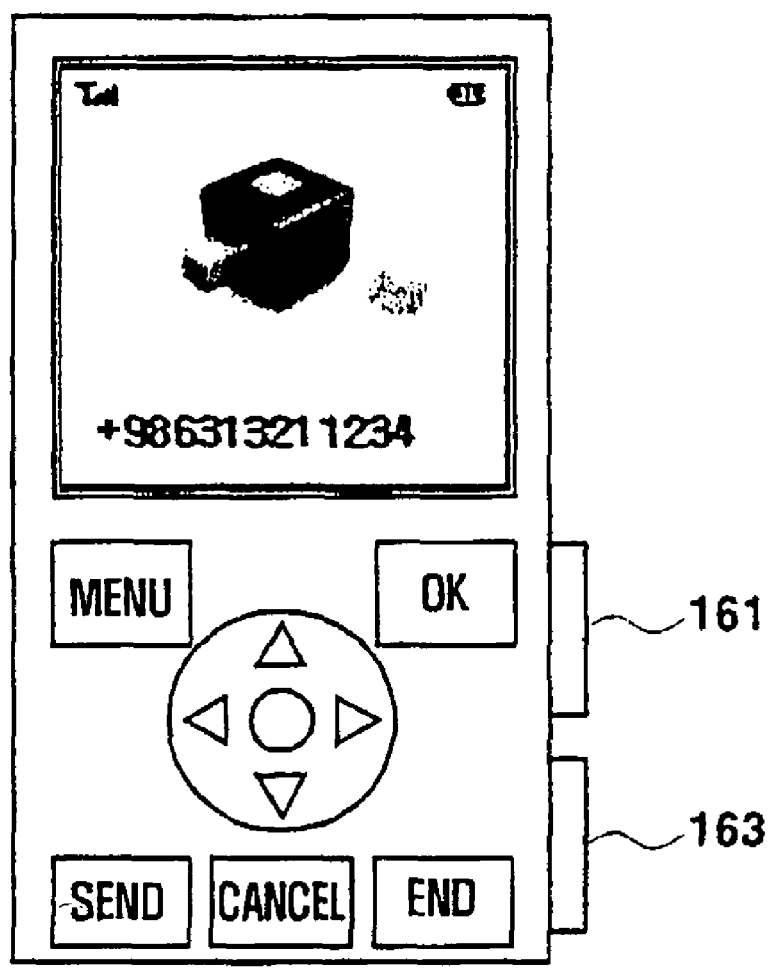
FIGS. 8A to 8C are front views of the mobile terminal of FIG. 1 illustrating steps of executing an additional function in a voice communication mode according to an exemplary embodiment of the present invention.
Figure 8B:
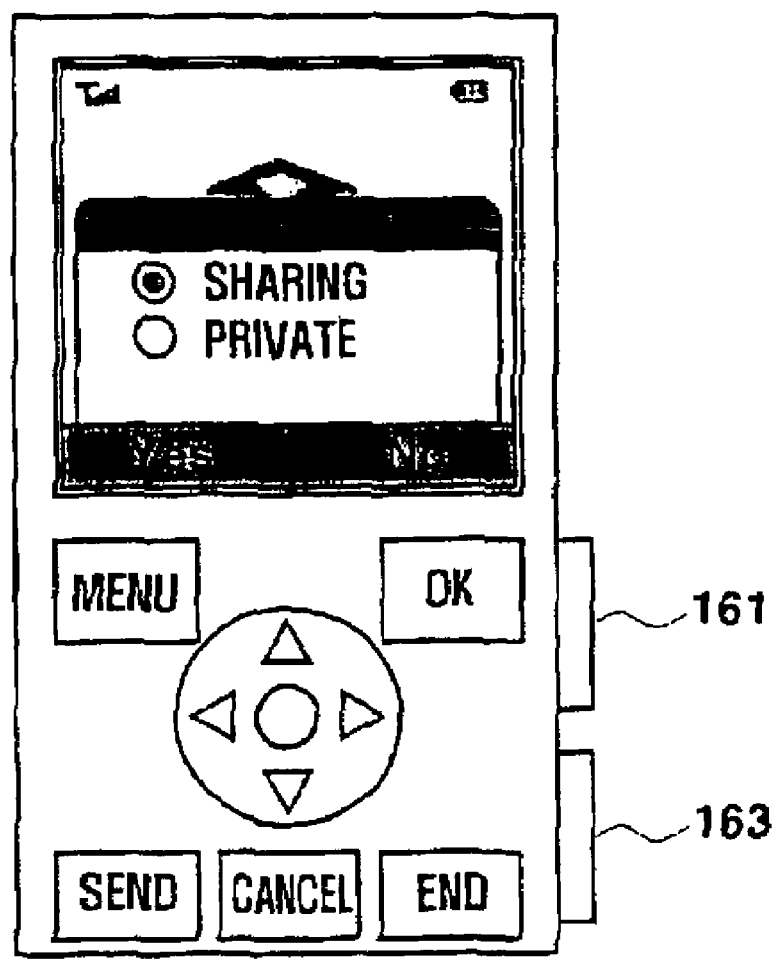

FIG. 8A is a front view of the mobile terminal, operating in the voice communication mode, of FIG. 1, and FIG. 8B is a front view of the mobile terminal of FIG. 1 when a command for activating an audio playback function is input while the mobile terminal operates in the voice communication mode. If a command for activating an audio playback function is input, a menu screen having "private" and "sharing" options is presented.

The control unit 170 determines which option is selected in Step 543 of FIG. 3D. If the "private" option is selected and then an audio playback function key 143 (FIGS. 6A-6C) is input, the control unit 170 controls the audio processing unit to process a predetermined audio file to be output through the speaker (SPK) as an audible sound wave in Step 545.

Figure 8C:
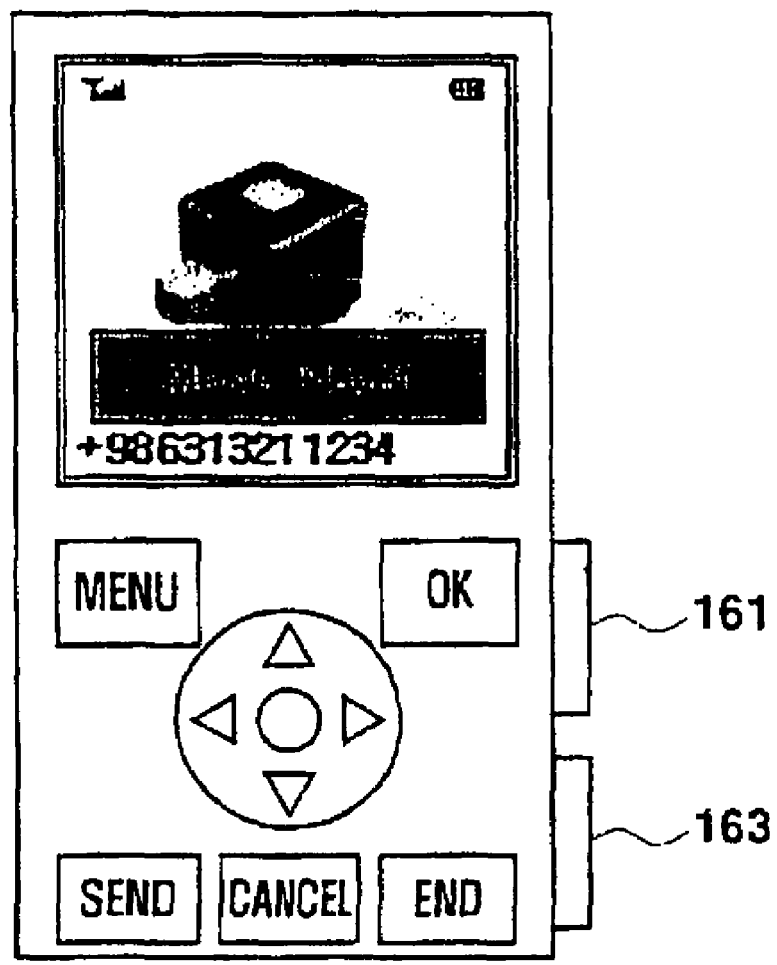

FIG. 8C is a front view illustrating a mobile terminal of FIG. 1 when an option selection command for activating the audio playback function is input.

If the "sharing" option is selected and then the audio playback function key 143 is input, the control unit 170 controls the audio processing unit to combine the voice and audio signal of the audio file, and transmits the combined signals to the counterpart terminal in Step 547 of FIG. 3D.

The control unit 170 detects a camera function activation command input by a camera function key 141 (FIGS. 6A-6C) while the mobile terminal operates in a shared background music communication mode. If the camera function activation command is detected, the control unit 170 controls the mobile terminal to perform a video telephony with shared background music.

Figure 4A:
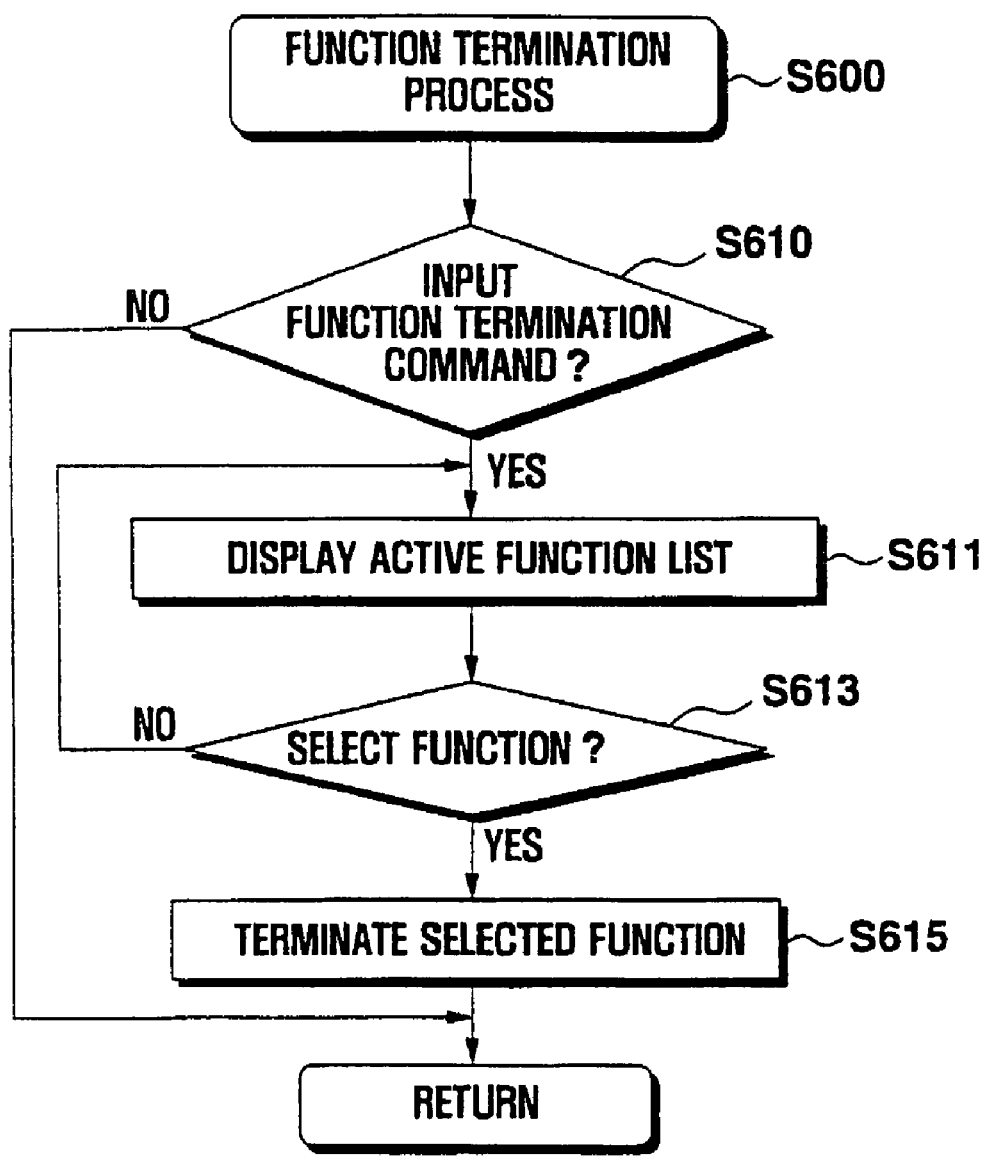
FIGS. 4A to 4D illustrate a function termination process of the multitasking method of FIG. 2 according to another exemplary embodiments of the present invention.

FIGS. 4A to 4D are flowcharts illustrating the function termination processes of the multitasking method of FIG. 2. FIG. 4A illustrates a functions termination process of the multitasking method according to an exemplary embodiment of the present invention.

Referring to FIG. 4A, in the functions termination process in Step 600, the control unit 170 determines whether a termination command for terminating a currently activated function in Step 610. If a termination command is input, the control unit controls the display unit 180 to display an active function list of currently activated functions in Step 611 and determines whether at least one function is selected from the active function list in Step 613. If a function is selected and a key is input for terminating the selected function, the control unit 170 terminates the operation of the selected function in Step 615.

Figure 4B:
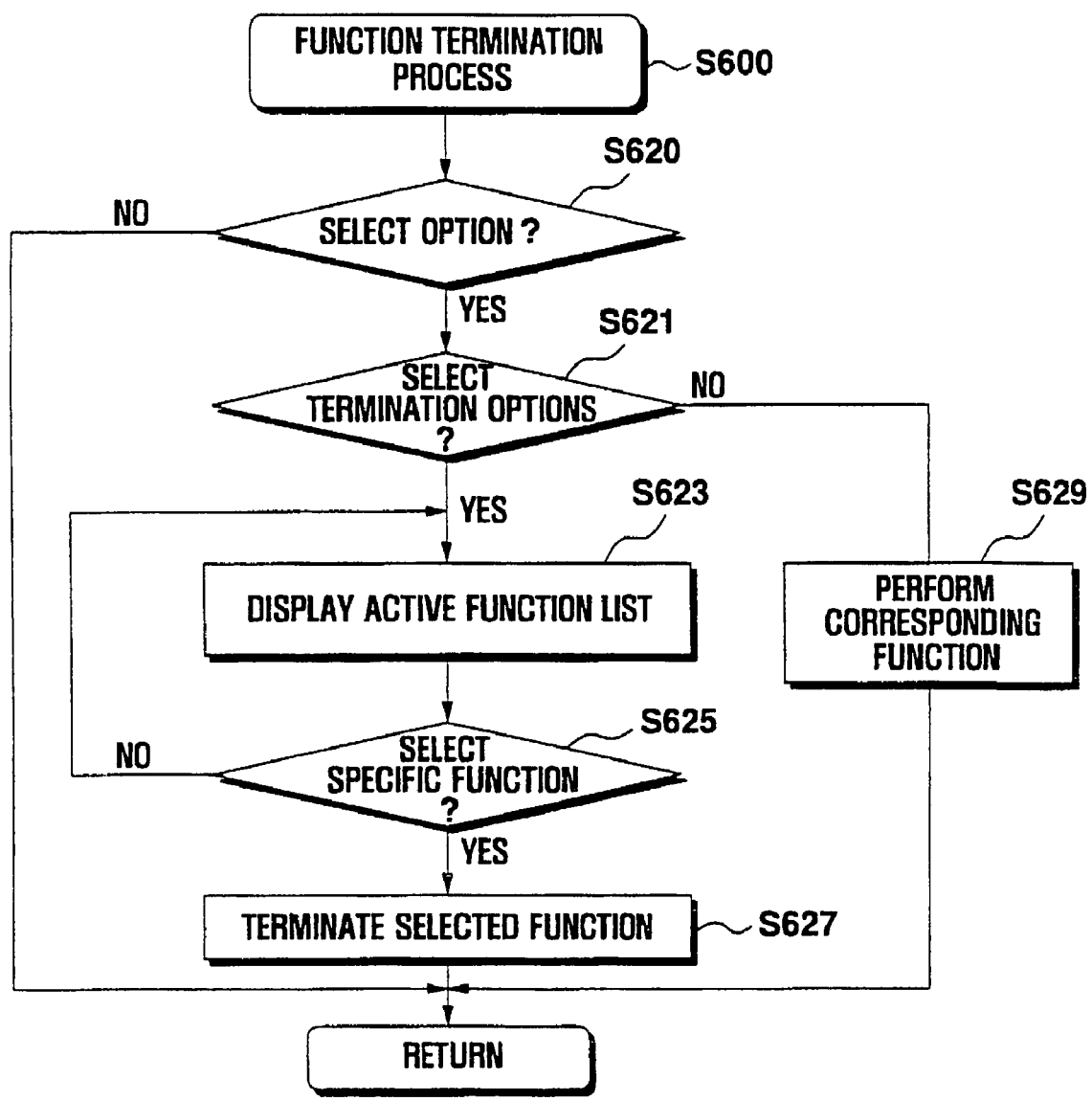

FIG. 4B illustrates a functions termination process of the multitasking method according to another exemplary embodiment of the present invention. Referring to FIG. 4B, in the functions termination processing 600, the control unit 170 displays a menu screen having options associated with an active function in accordance with a user command, and determines whether an option is selected from the menu screen in Step 620. At this time, the control unit 170 determines whether a termination option is selected among the options in Step 621. If a termination option is selected, the control unit 170 controls the display unit to display an active function list of currently activated functions in Step 623.

Next, the control unit 170 determines whether a command for selecting one of the active functions in Step 625. If at least one function is selected and a key is input for termination of the selected function, the control unit 170 terminates the operation of the selected function in Step 627.

At Step 621, if the selected option is not the termination option, the control unit performs a function corresponding to the selected option in Step 619.

Figure 4C:
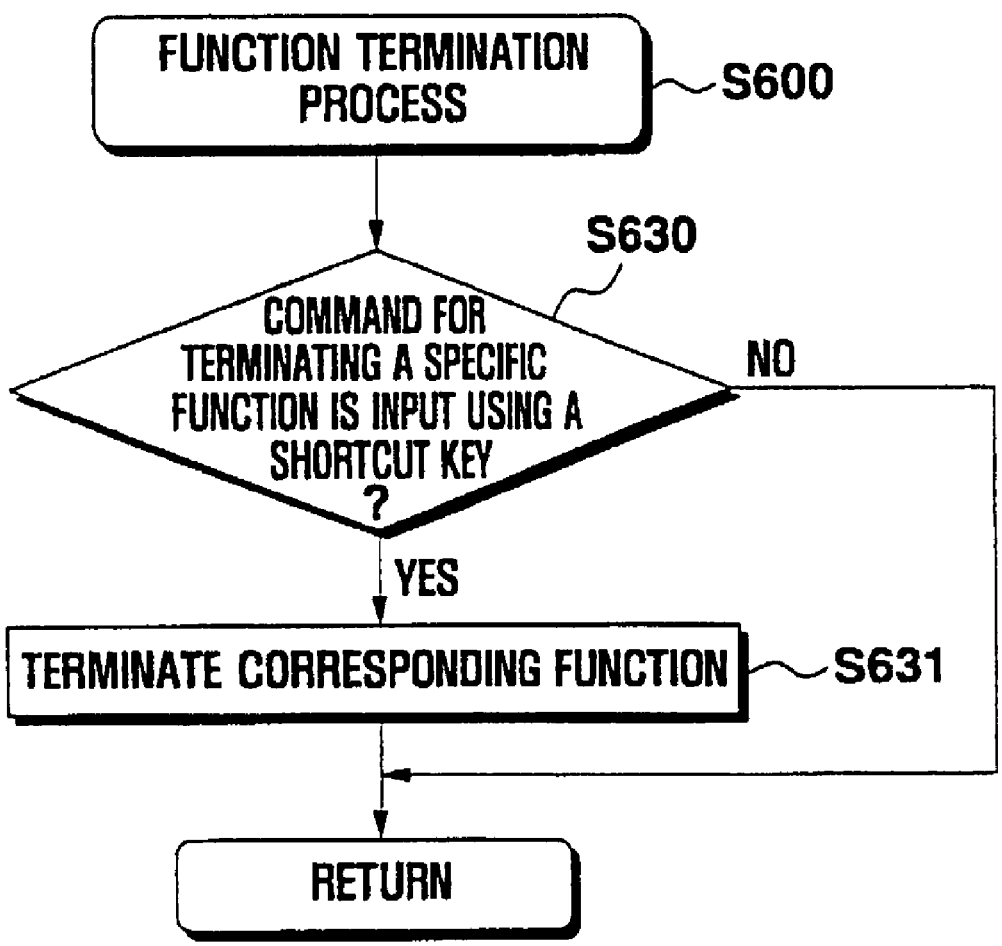

FIG. 4C illustrates a function termination process of the multitasking method according to another exemplary embodiment of the present invention. Referring to FIG. 4C, in the function termination process at Step 600, the control unit determines whether a command for terminating a specific function is input using a shortcut key in Step 630, and terminates, if a command for terminating a specific function is input, the function in Step 631.

Figure 4D:
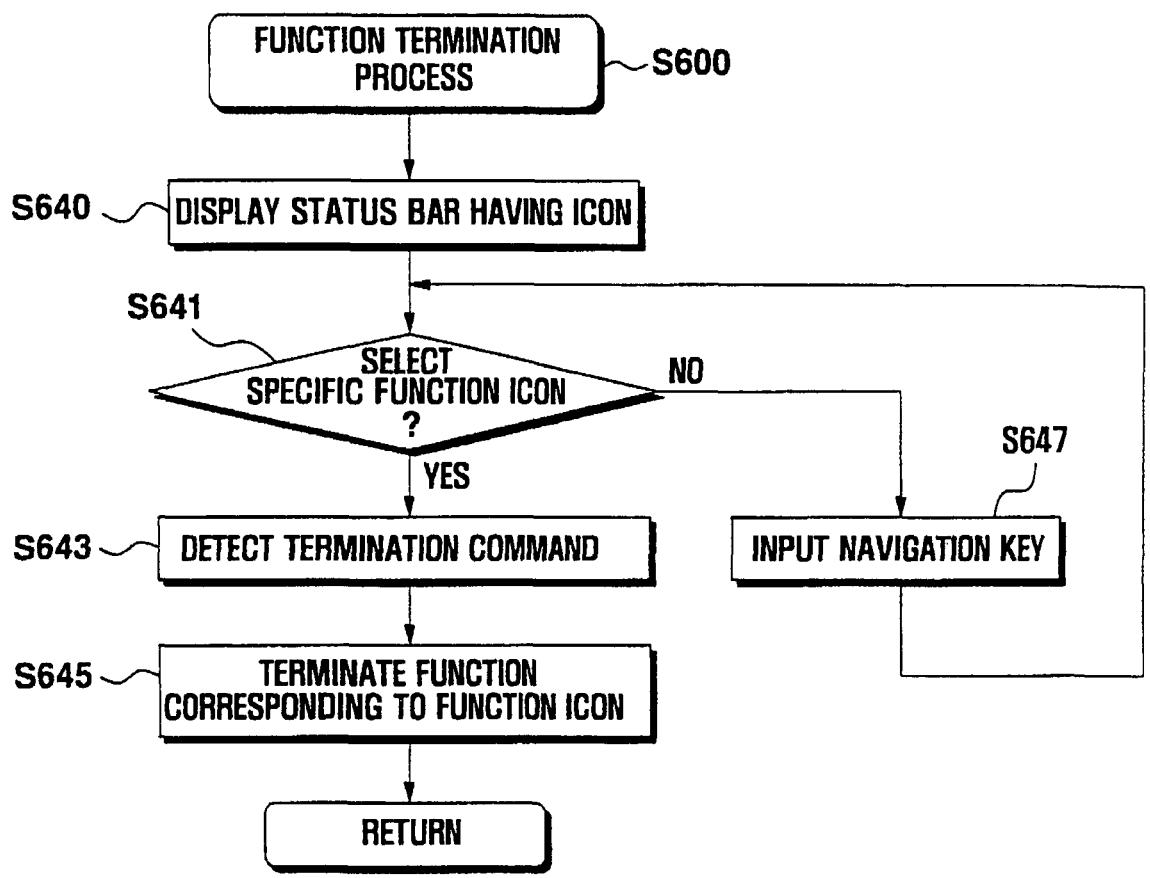

FIG. 4D illustrates a function termination process of the multitasking method according to another exemplary embodiment of the present invention. Referring to FIG. 4D, in the functions termination process in Step 600, the control unit 170 controls the display unit to display a status bar having icons representing the currently activated functions in accordance with a user command and detects a selection of an icon in Step 640. The status bar is displayed in accordance with a command input using the up and down keys.

Next, the control unit 170 detects a selection of one of the icons on the status bar and determines whether a specific function termination command is input in Step 641. If it is determined that a selected function termination command is input in Step 643, the control unit 170 terminates the function represented by the selected icon in Step 645.

If a selected function termination command is not input, the control unit 170 detects a key input for icon navigation in Step 647. The navigation between the icons is performed using the left and right navigation keys.

As described above, the multitasking method and mobile terminal enabled with the multitasking method are advantageous since at least two functions of the mobile terminal can be operated at the same time, resulting in provision of various converged services.

Also the multitasking method and mobile terminal enabled with the multitasking method allow activating a supplementary function, while the mobile terminal operates in a previously activated function mode, in an intuitive function selection manner, resulting in user convenience.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A mobile terminal comprising:
   an input unit for receiving a user command;
   a decision unit for determining, if a key signal is input through the input unit while at least one previously activated function operates, whether a function corresponding to the key signal can operate based on the previously activated function;
   a control unit for simultaneously activating, if the decision unit determines that the function corresponding to the key signal can operate based on the previously activated functions, the previously activated function and the function corresponding to the key signal; and
   a display unit for displaying operation status of the function corresponding to the key signal and the previously activated function on a screen.

2. The mobile terminal of claim 1, wherein the control unit controls the function corresponding to the key signal and the previously activated function to cooperate for providing a new function.

3. The mobile terminal of claim 1, wherein the control unit terminates, if a function termination command is input through the input unit, the function corresponding to the key signal and the previously activated function.

4. The mobile terminal of claim 1, wherein the control unit terminates, if a specific function termination command is input through the input unit, a corresponding function in accordance with the specific function termination command.

5. The mobile terminal of claim 1, wherein the decision unit determines whether the function corresponding to the key signal and previously activated function are preset cooperative functions.

6. The mobile terminal of claim 5, wherein the preset cooperative functions comprise a voice communication function, an audio playback function and a camera function.

7. The mobile terminal of claim 1, further comprising a communication unit which combines, if the previously activated function is a voice communication function and the function corresponding to the key signal can simultaneously run with the previously activated function, a signal generated by the previously activated function and the function corresponding to the key signal and transmits the combined signal under the control of the control unit.

8. The mobile terminal of claim 1, wherein the display unit displays a screen having windows presenting images associated with the previously activated function and the additional function corresponding to the key signal.

9. The mobile terminal of claim 1, wherein the display unit displays an image associated with the function corresponding to the key signal on an image associated with the previously activated function.

10. The mobile terminal of claim 9, wherein the image associated with the function corresponding to the key signal can be adjusted in transparency.

11. The mobile terminal of claim 1, wherein the display unit displays icons representing the previously activated function and the function corresponding to the key signal at a predetermined position of the screen.

12. A multitasking method for a mobile terminal, the method comprising:
   determining, if a key signal is input while at least one previously activated function is operating, whether a function corresponding to the key signal can operate based on the previously activated function;
   simultaneously activating, if the function corresponding to the key signal can operate based on the previously activated function, the previously activated function and the function corresponding to the key signal; and
   displaying operation status of the function corresponding to the key signal and the previously activated function on a screen.

13. The multitasking method of claim 12, wherein simultaneously activating the previously activated function and the function corresponding to the key signal comprises generating another function by combining the function corresponding to the key signal and the previously activated function.

14. The multitasking method of claim 12, further comprising terminating operations of the function corresponding to the key signal and the previously activated function at the same time in response to an active function terminate command.

15. The multitasking method of claim 12, further comprising terminating one of the activated functions in response to a specific function terminate command.

16. The multitasking method of claim 12, wherein determining whether the function corresponding to the key signal can operate based on the previously activated function further comprises determining whether the function corresponding to the key signal and the previously activated function are preset cooperative functions.

17. The multitasking method of claim 16, wherein the preset cooperative functions comprise a voice communication function, an audio playback function and a camera function.

18. The multitasking method of claim 12, wherein determining whether the function corresponding to the key signal can operate based on the previously activated function further comprises transmitting, if the previously activated function is a voice communication function and the function corresponding to the key signal can operate based on the previously activated function, a combined signal generated by combining the previously activated function and the function corresponding to the key signal.

19. The multitasking method of claim 12, wherein displaying operation status comprises producing a screen having windows presenting images associated with the respective activated functions.

20. The multitasking method of claim 12, wherein an image presenting operation status of the function corresponding to the key signal is overlapped an image presenting the operation status of the previously activated function.

21. The multitasking method of claim 20, wherein the image of the function corresponding to the key signal can be adjusted in transparency.

22. The multitasking method of claim 12, wherein the screen comprises a status bar presenting icons representing the activated functions on predetermined positions.

* * * * *